US007232265B1

(12) United States Patent
Price

(10) Patent No.: US 7,232,265 B1
(45) Date of Patent: Jun. 19, 2007

(54) SEAT WITH ARTICULATING CAMERA SUPPORT

(76) Inventor: Roger W. Price, 625 E. McAllister St., Lebanon, IL (US) 62254

( * ) Notice: Subject to any disclaimer, the term of this patent is extended or adjusted under 35 U.S.C. 154(b) by 0 days.

(21) Appl. No.: 10/865,120

(22) Filed: Jun. 10, 2004

Related U.S. Application Data

(60) Provisional application No. 60/478,721, filed on Jun. 16, 2003.

(51) Int. Cl.
*G03B 17/00* (2006.01)
*F16M 11/04* (2006.01)
(52) U.S. Cl. .................... 396/428; 248/187.1; 352/243
(58) Field of Classification Search ................ 352/243; 396/419, 428; 248/187.1; 348/373–376
See application file for complete search history.

(56) References Cited

U.S. PATENT DOCUMENTS

| | | | | |
|---|---|---|---|---|
| 2,180,214 A * | 11/1939 | Rapp | ........................ | 248/181.1 |
| 3,352,521 A * | 11/1967 | Tyler | ...................... | 248/123.11 |
| 4,640,481 A * | 2/1987 | Kohno | ........................ | 248/126 |
| 4,685,649 A * | 8/1987 | McKay | ........................ | 248/594 |
| 5,476,241 A * | 12/1995 | Helman | .................... | 248/286.1 |
| 6,021,984 A * | 2/2000 | Mills | ........................ | 248/219.4 |
| 6,123,306 A * | 9/2000 | Jackson | .................... | 248/296.1 |
| 6,142,573 A * | 11/2000 | Harding et al. | ......... | 297/452.25 |
| 6,254,116 B1 * | 7/2001 | Szumlic et al. | .......... | 280/304.1 |
| 2003/0057749 A1 * | 3/2003 | Buono | ...................... | 297/217.3 |

* cited by examiner

*Primary Examiner*—W. B. Perkey
*Assistant Examiner*—Rishi S. Suthar
(74) *Attorney, Agent, or Firm*—Polster, Lieder, Woodruff & Lucchesi, L.C

(57) ABSTRACT

A support for a video camera comprising a seat, a vertical support frame on one side of the seat, an arm rest on the vertical camera support frame, and an elongated, adjustable boom extending outward from the vertical camera support. The boom is pivotally attached to the support frame to allow side-to-side movement and includes a centrally positioned elbow joint to allow vertical adjustment of the distal end of the boom. The boom includes a telescoping segment to adjust its length. The boom has a handle at the distal end. The handle includes a camera mount on its upper surface. The handle is attached to the boom by a ball and socket joint that allows full range of movement of the handle.

21 Claims, 4 Drawing Sheets

SEAT WITH ARTICULATING CAMERA SUPPORT

CROSS REFERENCE TO RELATED APPLICATIONS

This application claims priority to provisional patent application Ser. No. 60/478,721, filed Jun. 16, 2003.

BACKGROUND OF THE INVENTION

The use of hand held video recording cameras has increased dramatically in recent years. Video recording cameras come in many styles and formats including VHS format video recorder, digital video recorders, and recently, cameras that record directly to digital videodiscs. Such cameras, whatever the format, generally are referred to as "camcorders".

Although the size and weight of camcorders have been reduced in recent years, it can be inconvenient and tiring for the user to hold the camera while recording, particularly if recording a lengthy event, such as a wedding, graduation, sporting event or other such event. The user can suffer from arm fatigue and movement results in an uneven or shaky picture. Generally, for longer events, the user supports the camcorder on a convention camera tripod. However, these devices are not without drawbacks. They can be cumbersome to carry and set up, they don't readily fit in seating areas, such as bleachers or church pews, and they usually require the user to stand and bend over the camera, which can be tiring and uncomfortable.

It would be beneficial, therefore, to have a video recording camera support that allows the user to sit in a comfortable position and record events. It also would be beneficial to have such a support device that can be placed or positioned in a seating area with limited space, such as a church pew or bleacher seats. Moreover, it would be beneficial to have such a support device that allows a full range of movement of the camera.

SUMMARY OF THE INVENTION

Briefly stated, a support for a camera is provided that incorporates a seat, a vertical support frame on one side of the seat, an arm rest on the support for supporting the user's arm, and an adjustable, elongated boom, having pivotally attached to, and extending outward from the support frame. There is a handle at the distal end of the boom. There is a camera mount on the handle. The handle is connected to the boom by a ball and socket joint that allows a full range of motion of the camera. The seat can be placed on a support surface, such as a bleacher seat or church pew. The user can sit on the seat, place his arm on the arm support and grasp the handle and move the camera in a full range of motion. The user can remain seated with his arm comfortably supported while recording events.

DETAILED DESCRIPTION OF THE INVENTION

Figure 1:
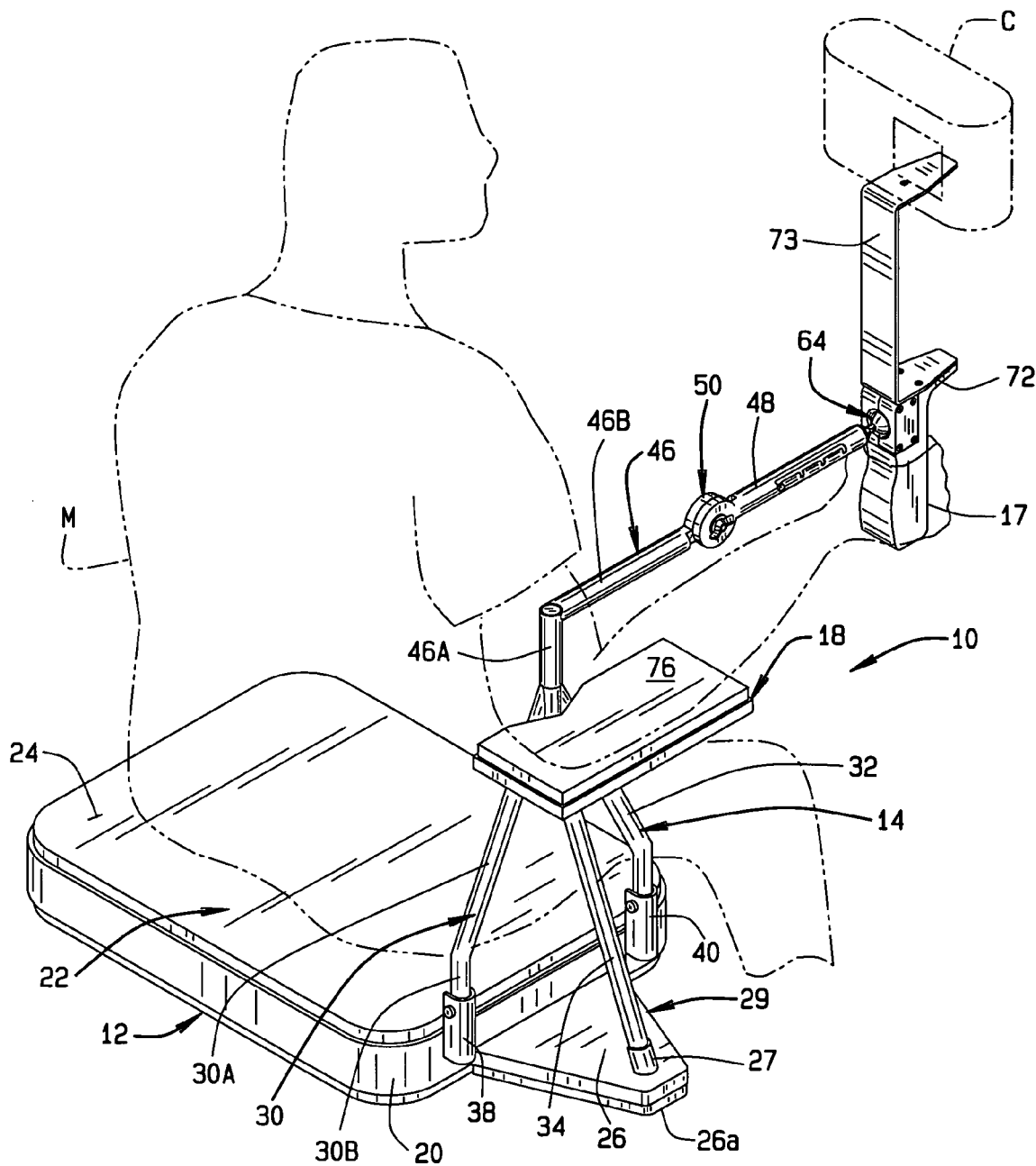
FIG. 1 is a perspective view of the camcorder support of the present invention with the camcorder and user shown in phantom to illustrate environment.

The camcorder support of the present invention is indicated by reference numeral 10 in the various drawing figures. Although the preferred use of the invention is to support a camcorder and the arm of the person using the camcorder to prevent movement of the camera and fatigue to the user, it will be appreciated that the present invention can be used to support any type of camera, including a still photograph camera, either conventional film type or digital. As used herein, the term camera is intended to include any moving or still picture-taking device including camcorders. Furthermore, the term camcorder is used to describe any type of camera used to record or film action or events and is intended to encompass digital recorders, VHS format recorders, even conventional movie cameras, such as 8 or 16 mm film movie cameras. Hence, when the term "camera" is used herein, it is intended to encompass a camera in the broadest sense, including any type of camera, presently known or unknown, for taking still picture or moving pictures although the invention primarily is used with a video camcorder or the like.

Furthermore, the individual using the invention, i.e. the operator of the camera mounted on the invention, may be referred to as the user, the photographer, the cameraman, the videographer or any similar term that denotes one who would use a camera to take movies or still photographs.

In any event, as shown in the drawings, the camcorder support 10 of the present invention includes, as major components, as seat 12, a vertical support 14 attached to one side of seat 12 with a substantially horizontally extending adjustable elongated arm 16 pivotally connected to the top of vertical support 14. There is a rotatable handle 17 at the distal end of elongated arm 16 with a camera mount at the upper surface of the handle. The camcorder support 10 also includes an armrest 18 attached to vertical camera support. These components and subcomponents will now be described in greater detail.

As shown in FIG. 1, in the illustrated embodiment seat 12 is generally rectangular in shape, having a frame 20 surrounding a padded seat cushion 22, which provides a seating surface 24 for the cameraman M. Seat 12 can be of any useful configuration and size, however, the rectangular design measuring approximately 14 inches by 16 inches works well for its intended purpose. Although not shown, in the illustrated embodiment, seat 12 has a substantially flat bottom surface and is designed to rest on a support surface, such as a chair, bleacher seat, church pew or the like. Although not shown, seat 12 can employ legs, preferably removable, extending downward from the bottom surface to elevate the seat above the support surface, if desired, and also can employ a vertically or upright back, also removable, to provide added support and comfort to cameraman. In any event, seat 12 is designed to provide comfortable seating for cameraman M.

There is a platform 26 extending out from one side of frame 20. Platform 26 can be permanently or removably attached to the frame or can be attached by a hinge to allow it to fold up, if desired. Platform 26 is shown attached to seat 12 for use by a right-handed cameraman M, but can just as well be attached to the opposite side of the seat to more readily accommodate a left-handed user. Also, platform 26 can be removably affixed to frame 20 so as to allow it to be mounted to either the left side or the right side of seat 12 to increase the versatility of the invention. Platform 26 in the illustrated embodiment has a substantially triangular configuration, with the base of the triangle adjacent frame 20 and the apex of the triangle extending out from the seat. There can be padding 26A on the bottom surface of the platform. There is a short, inwardly angled leg mounting sleeve 27, having a hole 28 therethrough, at the apex.

Figure 2:
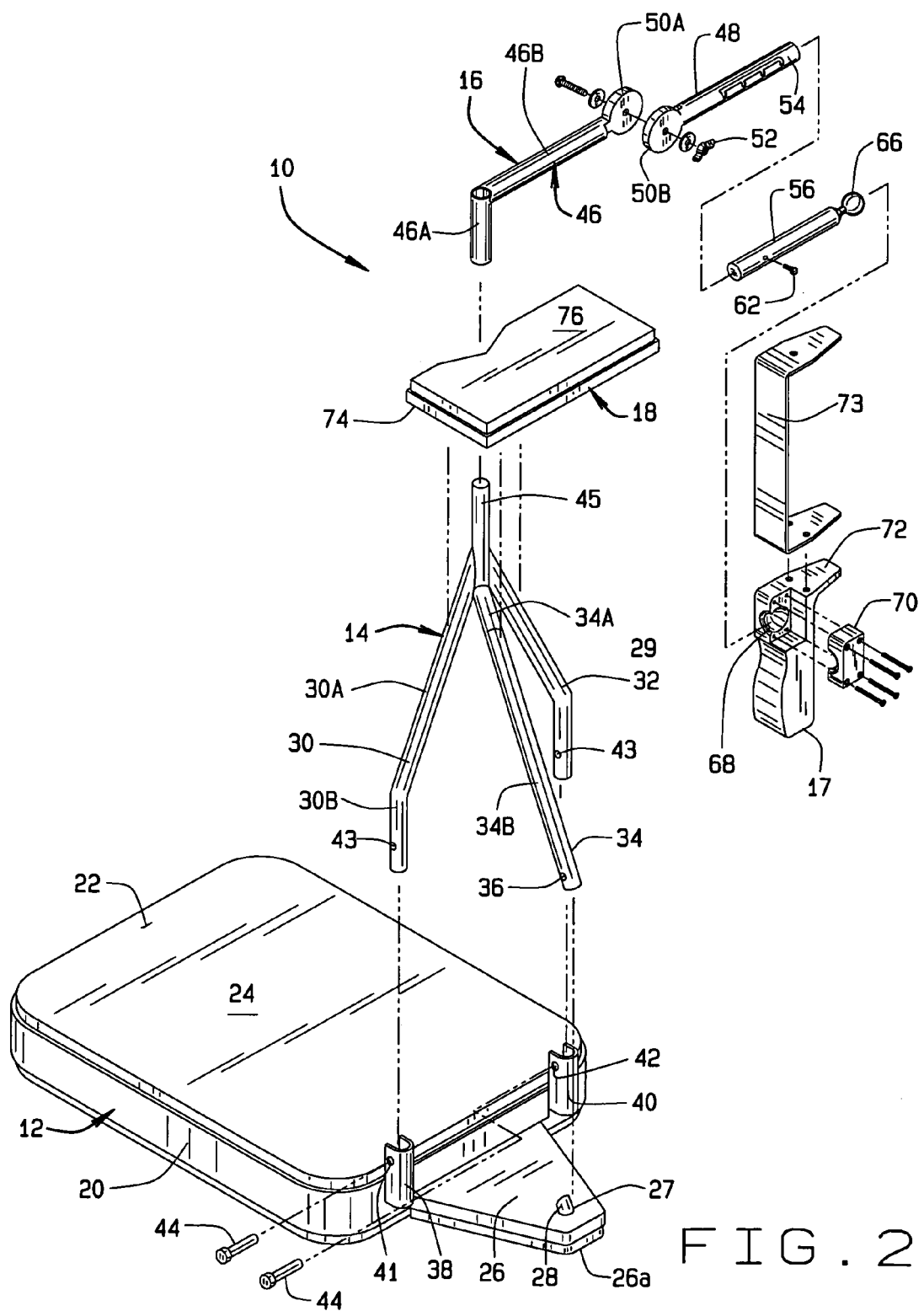
FIG. 2. is an exploded view of the camcorder support of the present invention.
Figure 3:
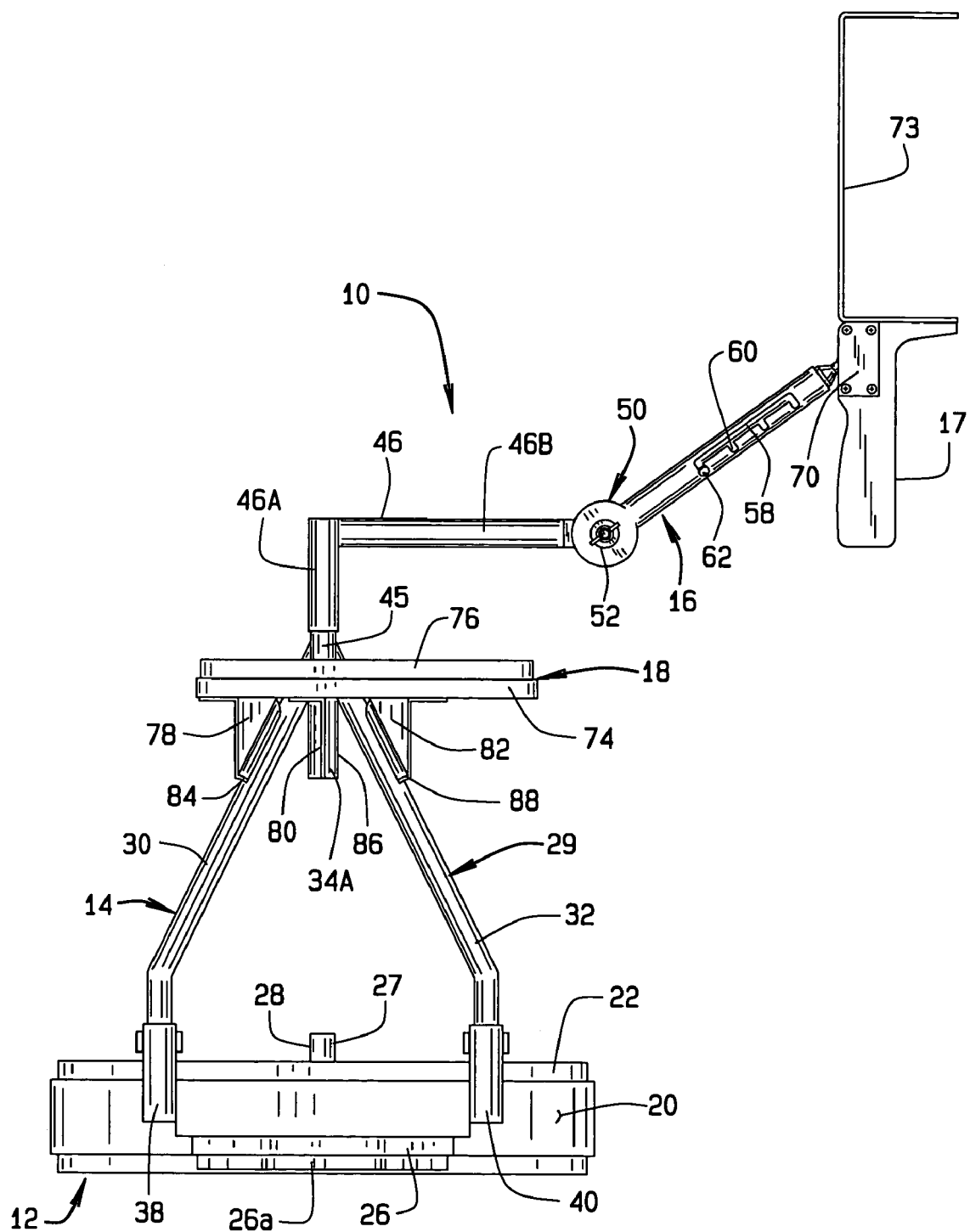
FIG. 3 is a side elevational view of the camcorder support of the present invention with one leg of the vertical support removed.
Figure 4:
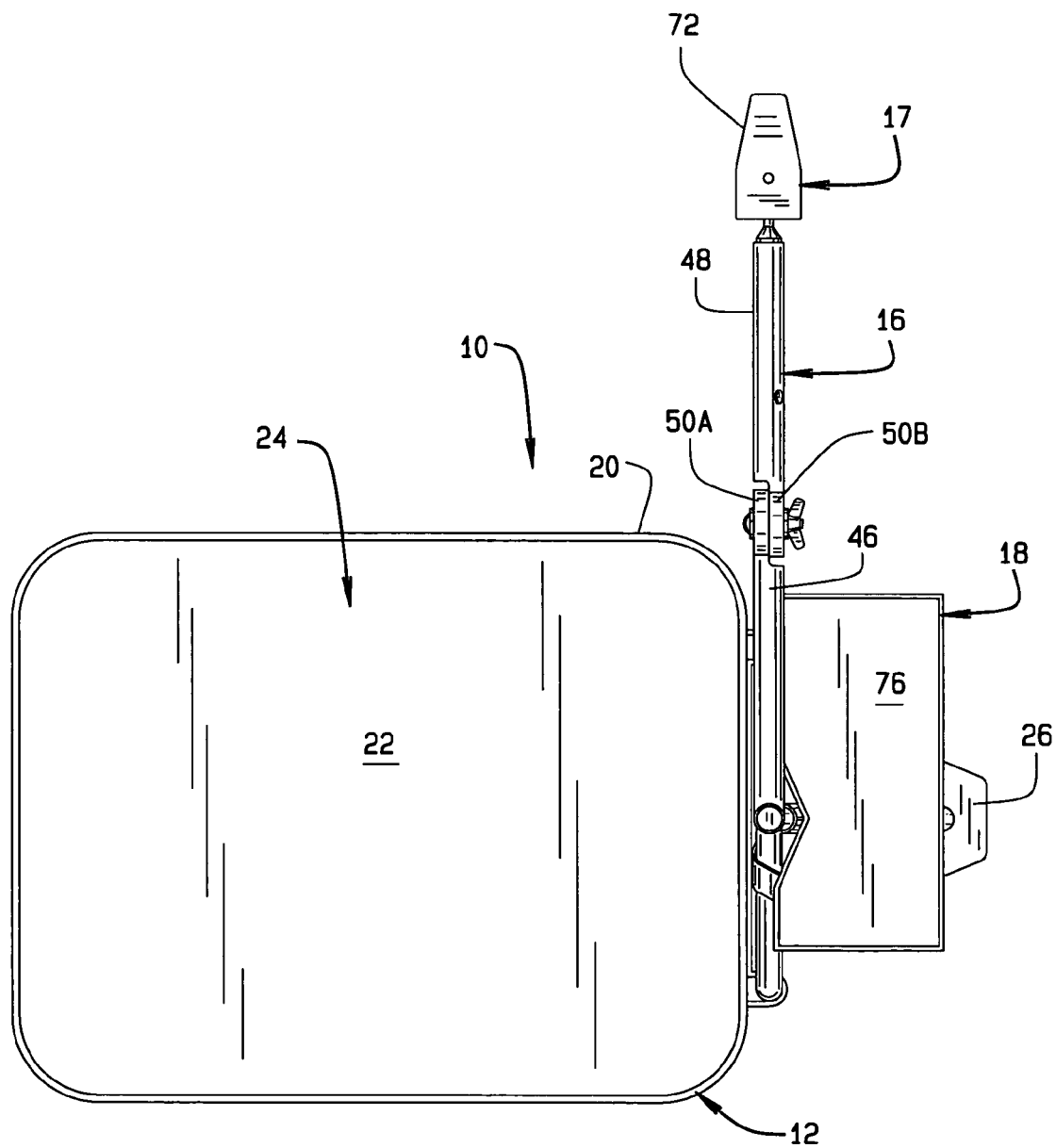
FIG. 4 is a top plan view thereof.

The vertical support 14 is attached to platform 26 and seat frame 20 as shown in greater detail in FIGS. 2 and 3. In the illustrated embodiment, vertical support 14 includes a tripod frame section 29 that includes a first, outwardly angled lateral leg 30 and opposed second, outwardly angled lateral leg 32 in the same vertical plane and a third leg 34 positioned in the middle of the two side legs and angled downwardly and outwardly toward mounting sleeve 27. Third leg 34 is segmented, with an upper segment 34A affixed between the upper ends of the lateral legs and a removable bottom segment 34B. FIG. 3 is a side elevational view in which bottom section 34B is removed. The removable bottom segment 34B can threadedly engage upper segment 34A by a concentric threaded extension (not seen) that screws into a threaded hole (not seen) the end of the upper segment. The end of bottom segment 34B has a hole 36 therethrough. When the end of bottom segment 34B is seated in sleeve 27, a securing pin or screw or other fastener is inserted through holes 28 and 36 to hold it in place.

Lateral legs 30 and 32 are attached to frame 20 by U-shaped brackets 38 and 40, that include mounting holes 41 and 42, respectively in the upper ends. Brackets 38 and 40 are affixed to the seat frame. These brackets extend above seat 12. Lateral leg 30, with lateral leg 32 being a mirror image, has an outwardly angled main section 30A and a vertically disposed terminal end 30B. Terminal end 30B has a hole 43 formed therethrough.

The vertically disposed terminal ends of the lateral legs are inserted into U-brackets 38 and 40. A pivot pin 44 or other fastener is inserted through holes 41 and 42 and the respective holes 43 in the terminal ends of the lateral legs to releasably secure the legs in the brackets. It will be appreciated that removable segment 34B of leg 34 can be removed and legs 30 and 32 pivoted inwardly in brackets 38 and 40 to allow vertical camera support 14 to fold for transport or storage.

There is a vertically extending pivot post 45 at the top of the vertical camera mount. The upper ends of the lateral legs and the third leg are generally affixed to the lower end of pivot post 45 so that a substantial portion of the pivot post extends above the legs.

Elongated arm 16 is pivotally attached to pivot post 45 to allow arm 16 to rotate about the pivot in a horizontal plane. The arm 16 also can be referred to as a camera boom. In any event, arm 16 includes a first segment 46 generally comprises an L-shaped tube having a vertically extending sleeve section 46A and a horizontally extending section 46B. Sleeve section 46A has an inner diameter that is slightly oversized relative to pivot post 45 so that sleeve section 46A fits over pivot post 45. It will be appreciated that pivot post 45 and the inside of section 46A can be lubricated or can be lined with a reduced friction material such as Teflon®. In any event sleeve section 46A can freely rotate around pivot post 45.

Arm 16 also includes a second segment 48 that is connected to the distal end of section 46B by a joint. In the illustrated embodiment, the connection is made by elbow joint 50. However, the joint can be of any acceptable design, such as a hinge, ball and socket, or any joint that allows elevation of segment 48 relative to segment 46. In the illustrated embodiment, elbow joint 50 is comprised of a substantially circular extension 50A on the distal end of section 46B and a complementary extension 50B on the proximal end of segment 48. There are detents (not seen) on the inner surfaces of the extensions 50A and 50B, which keep the circular extension aligned when segments 46 and 48 are in a desired angular relationship. The circular extensions can include ball bearings or the like to facilitate rotation. The extensions are biased together by a bolt and wing nut assembly 52. In any event, the cameraman M can adjust the angle of segment 48 by bending at the elbow joint. Hence the distal end of segment 48 can be raised or lowered relative to segment 46 at joint 50.

Segment 48 is telescoping and includes an outer sleeve 54 and an inner rod 56, as best seen in FIG. 2. Sleeve 54 has an elongated horizontal slot 58 with a series of short vertical slots 60 that function as stops. Rod 56 includes a protruding detent 62 that can move back and forth in slot 58 and then engage a selected slot 60 to hold the rod in a desired position. Thus the cameraman can adjust length of arm 16 to comfort.

Arm 16 includes a handle 17 at its distal end, movably attached to segment 48 by a ball and socket joint. In the illustrated embodiment, handle 17 has a comfortable pistol grip configuration. Rod 56 includes a round ball 66 at its terminus. Handle 17 includes a spherical socket 68 to seat ball 66 and allow a full range of motion, or articulation, of handle 17 about the ball. In the illustrated embodiment, socket 68 is formed in handle 17 with a removable section 70 that permits placement of ball 66 in socket 68. In one embodiment of the invention, both the ball and socket can be lubricated or constructed from a reduced friction material such as Teflon®.

Handle 17 has a camera mount apparatus on a top surface, indicated generally at 72. Camera mount apparatus 72 can be of any conventional design to allow removable attachment of a selected camera. It will be noted that a camera C can be mounted directed to the top of the handle or, in another preferred embodiment, an elevating, C-shaped bracket 73 or riser can be attached to the top of the handle and then the camera mounted on the top of the bracket, as shown in FIG. 1. It will be appreciated that the bracket can be adjustable so as to adjust the vertical height, for example by a vertical slot and screw arrangement or the like. In any event, when reference is made to a camera mounting apparatus on the handle, it can encompass mounting structure with or without the elevating bracket.

The camcorder support of the present invention includes armrest 18. In the illustrated embodiment, armrest 18 is a horizontally orientated platform having a frame 74 and a padded resting surface 76. Armrest 18 can be removably mounted on the vertical support 14 and is generally positioned below the arm 16 so that the cameraman's arm is positioned below arm 16 in use.

Armrest 18 can be attached to the vertical support in any acceptable fashion. In one embodiment, there are three triangular brackets 78, 80 and 82 attached to and extending down from the bottom side of frame 74. These three brackets include open feet 84, 86 and 88 that have a C-shaped cross section so that that the feet engage and rest on the rounded surface of legs 30, 32 and 34, respectively. As a result of the triangular arrangement of the legs and the positioning of the armrest brackets and feet, downward pressure of the cameraman's arm is sufficient to secure the armrest in place. Other or alternative attachment or fastening means is within the scope of the invention.

Armrest 18 can be attached to the vertical support so that it can be adjustable up and down to accommodate the user. Armrest 18 is readily removable. The armrest can simply be lifted off to remove. Furthermore, after camera C is removed, sleeve 46A can be lifted of pivot 45. Arm 16 can be folded by loosening elbow joint 50. Let 34 can be removed and vertical support 14 can be folded onto seat 12, as previously described.

In use, the cameraman properly assembles camcorder support 10 and places seat 12 on a supportive surface, such as a bench, chair, church pew or so forth. The user then positions himself on seating surface 24, placing his arm on armrest 18. He can adjust the length of segment 48 of arm 16 and raise or lower the camera C by adjustment at elbow joint 50, as described above. The user then can activate the camera C and grasp handle 17. Pivot post 45 and sleeve 46A allow the cameraman to move or sweep camera C side to side in as wide of arc as desired. Furthermore, the ball and socket joint joining handle 17 to the end of arm 16 allows the cameraman to move the camera in unlimited directions to film the action. By resting his arm on armrest 18, the cameraman can record while avoiding shaking or fatigue associated with free hand filming.

It will be appreciated that various changes and modifications may be made in the described embodiments without departing from the scope of the invention. Therefore, the foregoing description is illustrative of the best mode of working the invention presently known to the inventor, but should not be construed in a limiting sense.

The invention claimed is:

1. A support for a camera, comprising:
a seat for removable placement on a support surface, said seat having a front side, a rear side, a first lateral side and a second lateral side, a bottom surface for placement on the support surface and a top seating surface;
a vertical tripod support on one of said first or second lateral sides of the seat;
an armrest on the vertical tripod support; and
an elongated arm, having a proximal end and a distal end, said arm being attached to the vertical tripod support at its proximal end and including a handle attached by a ball and socket joint at the distal end of the arm, said handle including apparatus for the attachment of the camera.

2. The support for a camera of claim 1 wherein the arm includes an adjustable elbow joint at the approximate midpoint to allow raising or lowering of the distal end of the arm.

3. The support for a camera of claim 1 wherein the apparatus for attachment of the camera further comprises a bracket on the handle from elevating the camera above the handle.

4. The support for a camera of claim 1 wherein the armrest is positioned on the vertical tripod support below the proximal end of the arm.

5. The support for a camera of claim 1 wherein the handle has a pistol grip configuration.

6. The support for a camera of claim 1 wherein the seat further comprises a platform extending from said first lateral side of the seat or second lateral side of the seat for attachment of the vertical tripod support.

7. The support for a camera of claim 1 wherein the vertical tripod support is foldable for transport and storage.

8. The support for a camera of claim 1 wherein the seat has a plurality of legs extending down from a bottom side to elevate the seat above the support surface.

9. The support for a camera of claim 1 wherein the arm has a telescoping section whereby the length of the arm can be adjusted.

10. The support for a camera of claim 1 wherein the armrest is removably attached to the vertical tripod support.

11. An apparatus for supporting a camera for use by a cameraman in a seated position, comprising:
a seat for placement on a support surface, the seat including an upper seating area for the cameraman and a lower surface for placement on the support surface, a front side, a rear side, a first lateral side and a second lateral side;
a vertical support having a tripod frame attached to one of said first or second lateral sides of the seat;
an adjustable boom pivotally mounted on the vertical support;
a handle attached to a distal end of the boom by a joint that permits rotational movement of the handle;
a mount on the handle for the removable attachment of the camera; and
an armrest on the vertical support for support of the cameraman's arm when the cameraman is positioned on the seat, said armrest positioned so as to allow the cameraman to grasp the handle and move the camera in desired directions.

12. The apparatus of claim 11 wherein the seating area is padded.

13. The apparatus of claim 11 wherein the seat further comprises a laterally extending platform under the vertical support.

14. The seat and camera support combination of claim 13 further comprising a riser bracket between the camera mount and the camera.

15. The seat and camera support combination of claim 14 wherein the riser bracket is adjustable so as to allow adjustment of a height of the riser bracket.

16. A seat and camera support combination, comprising:
a seat having a bottom surface for placement on a support surface and a top seating surface;
a support frame platform on one side of said seat;
a vertical support frame having a tripod base and a pivot post at upper end on said platform;
an armrest attached to said tripod base;
an adjustable arm comprising a first segment pivotally attached to said pivot post and a telescoping second segment, said first and second segments being connected by an elbow joint that allows movement of the second segment in a vertical plane relative to the first segment;
a handle on a distal end of said second segment, said handle connected to said second segment by a ball and socket joint; and
a camera mount on said handle for the removable attachment of a camera.

17. The seat and camera support combination of claim 16 wherein the handle has a pistol grip configuration.

18. The seat and camera support combination of claim 16 wherein said armrest is removably attached to said tripod base.

19. The seat and camera support combination of claim 16 wherein said seat further comprises legs for engaging the support surface.

20. The seat and camera support combination of claim 16 wherein said tripod base is collapsible to facilitate transport and storage of the seat and camera support combination.

21. The seat and camera support combination of claim 16 wherein said armrest can be adjusted to move up and down on the tripod base.

* * * * *